Patented Dec. 16, 1924.

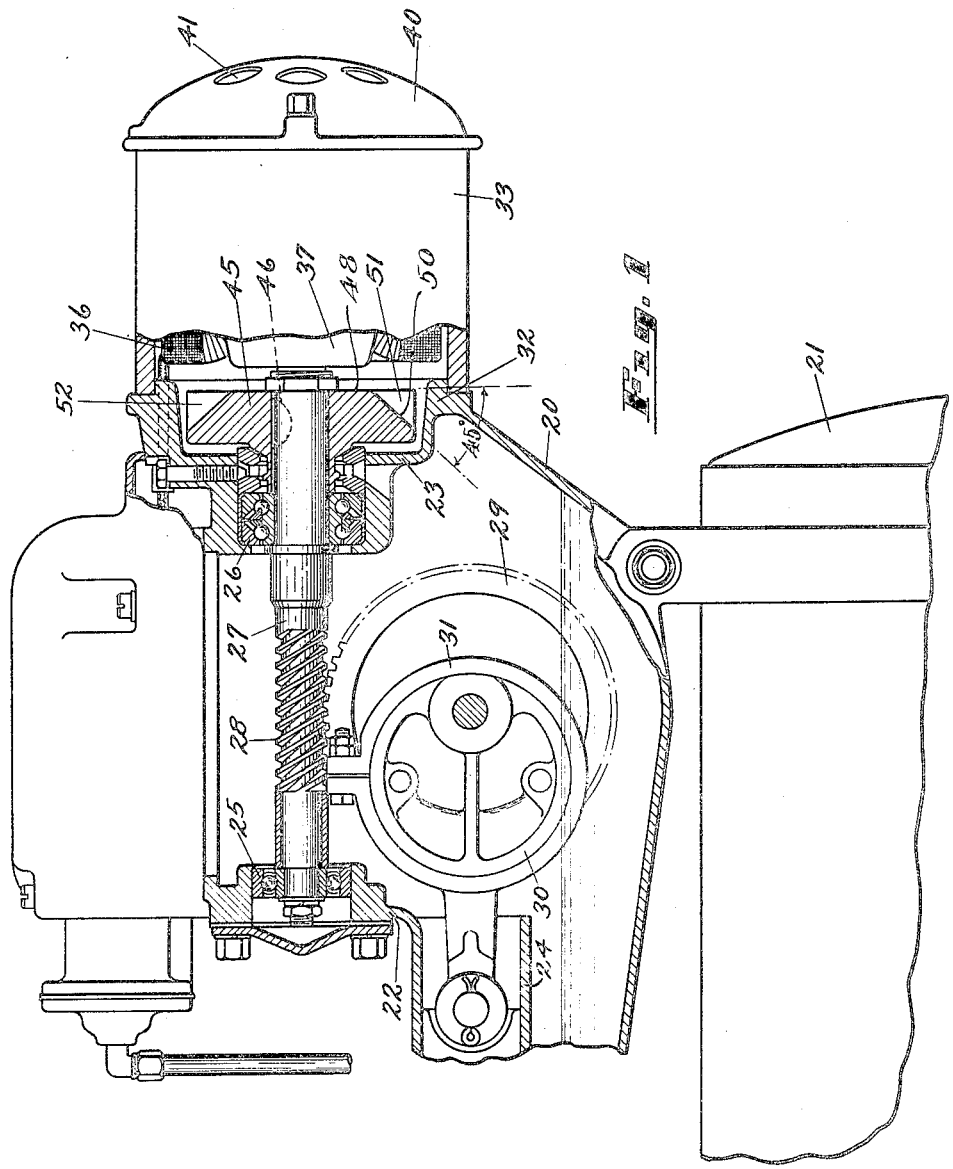

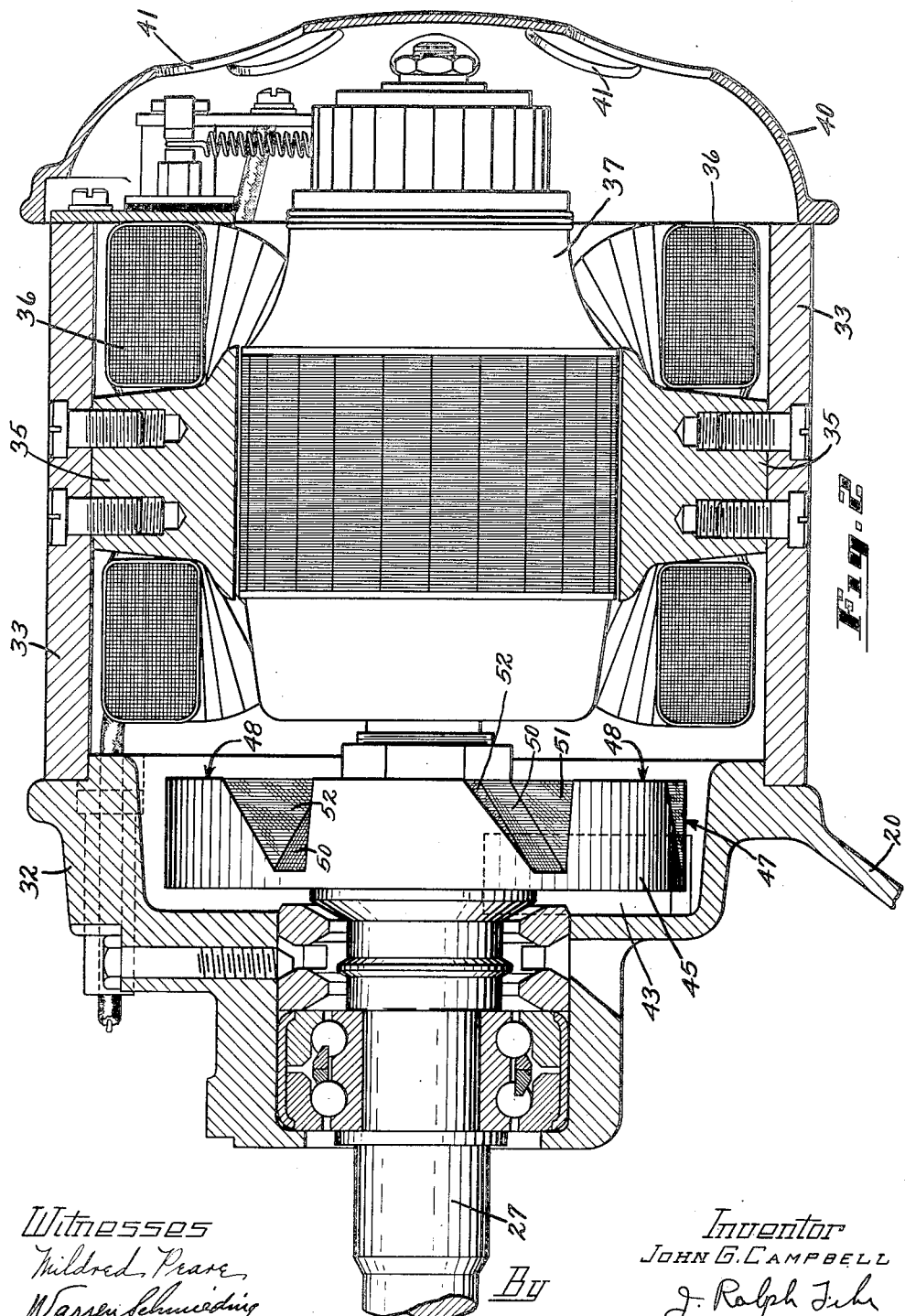

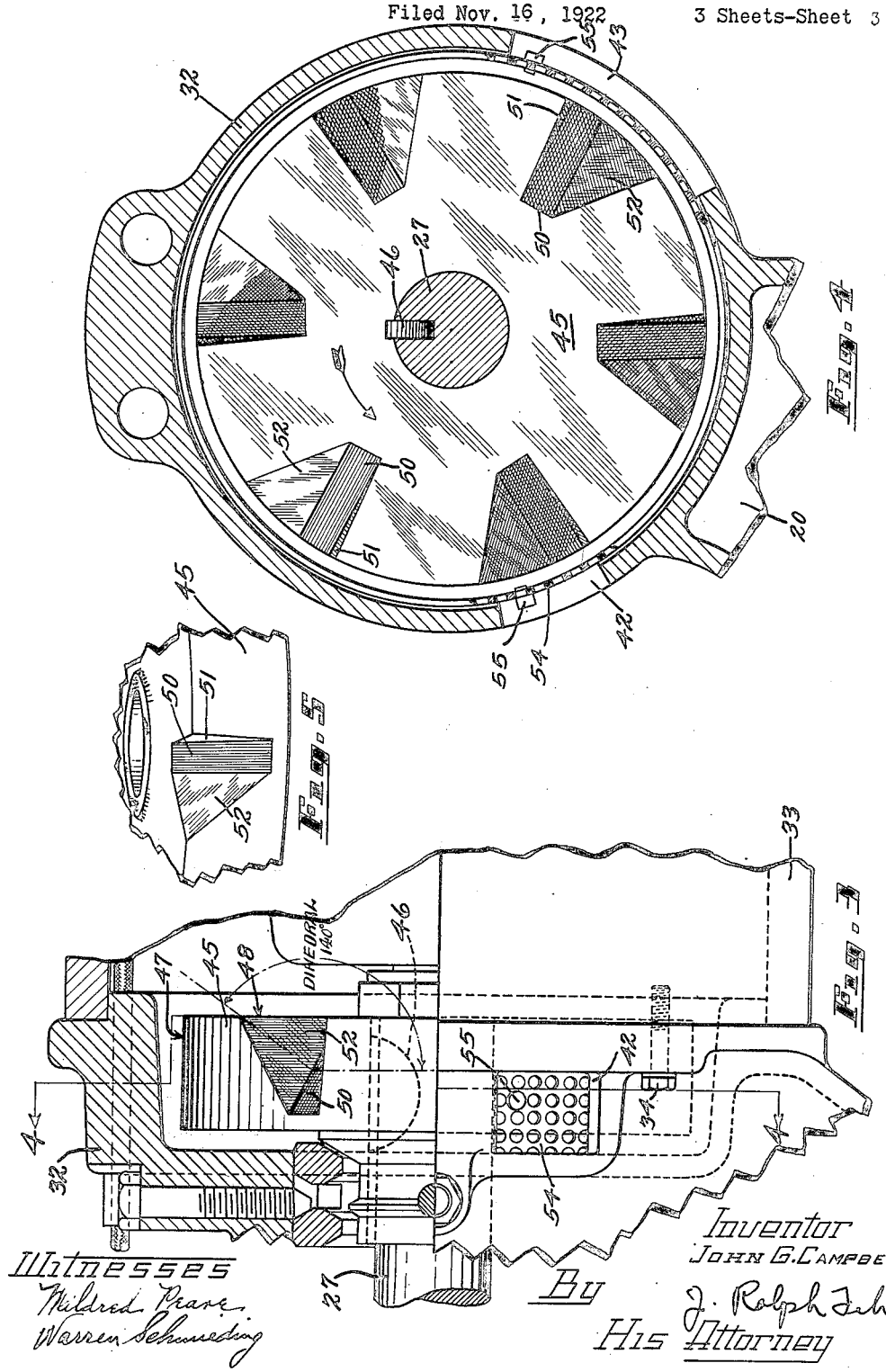

1,519,903

UNITED STATES PATENT OFFICE.

JOHN G. CAMPBELL, OF DAYTON, OHIO, ASSIGNOR TO DELCO-LIGHT COMPANY, OF DAYTON, OHIO, A CORPORATION OF DELAWARE.

FLYWHEEL FAN.

Application filed November 16, 1922. Serial No. 601,378.

*To all whom it may concern:*

Be it known that I, JOHN G. CAMPBELL, a citizen of the United States of America, residing at Dayton, county of Montgomery, State of Ohio, have invented certain new and useful Improvements in Flywheel Fans, of which the following is a full, clear, and exact description.

The present invention relates to flywheel fans for power devices, such as electric motors, which require cooling during operation thereof, and which are intended to drive devices having pulsating movements such as water and gas pumps.

It is among the objects of the invention to provide a flywheel fan having the necessary cooling and momentum effect, but which is relatively small in size whereby the flywheel fan may be conveniently located within the housing of the power device which it serves.

Further objects and advantages of the present invention will be apparent from the following description, reference being had to the accompanying drawings, wherein a preferred embodiment of one form of the invention is clearly shown.

In the drawings:

Fig. 1 is a view partly in section and party in elevation of a portion of a pumping apparatus to which my present invention may be applied;

Fig. 2 is a sectional view of the prime mover for said pumping apparatus;

Fig. 3 is a fragmentary view of the prime mover, a portion thereof being shown in section;

Fig. 4 is a view taken on line 4—4 of Fig. 3; and

Fig. 5 is a perspective view of a fragment of the flywheel fan.

The present invention is particularly applicable to the device shown in the application of George A. Buvinger and Clarence Warner, Serial No. 516,159, filed November 18, 1921, but not limited thereto and can be applied to any type of power device in which a momentum device is used.

Referring to the drawings, a pump gear casing 20 is shown mounted upon a storage tank 21 and is provided with end walls 22 and 23 and a sleeve 24. End walls 22 and 23 respectfully carry bearings 25 and 26 in which is journaled a shaft 27 provided with a worm 28. Worm 28 is adapted to rotate a worm gear 29 which in turn actuates an eccentric 30 to drive an eccentric strap 31 which imparts a reciprocatory motion to a member slidably mounted within the sleeve 24.

The gear casing 20 is adapted to contain a quantity of lubricant into which the worm gear 29 is adapted to immerge. Rotation of the gear 29 causes the lubricant to be splashed within the gear casing and onto said bearings 25 and 26.

The wall 23 is flared outwardly to form a cup-shaped end frame 32. A shell 33 is removably secured to the end frame 32 by bolt 34 (see Fig. 3), said shell carrying pole pieces 35 and winding 36, said members constituting the stator element of an electric motor or power device. Shaft 27 extends through the bearing 26 and carries at its outer end an armature 37 which is located in the shell 33, said armature being the rotor member of the electric motor.

The electric motor is provided with an end cover 40 having ventilating openings 41 which provide communication between the interior of one end of the motor and atmosphere, while the end frame 32 is provided with openings 42 and 43 in the sides thereof which establish communication between the interior of the opposite end of the motor and atmosphere. The shell 33, end frame 23, and end cover 40 form a housing for the motor.

The armature 37 is not heavy enough to sufficiently compensate for the pulsations caused by the apparatus being driven, therefore a flywheel or momentum device 45 is provided. Flywheel 45 is keyed to the shaft 27 between armature 37 and bearing 26 by key 46. This flywheel weighs approximately three pounds and the armature 37 weighs approximately ten pounds and with the added weight of the flywheel, a momentum device is provided of substantial weight to compensate for said pulsations.

It will be noted that the motor herein employed is of the type in which no outer bearing is provided, therefore it is desirable that the elements, carried by the extended portion of the shaft 27, are mounted as close to the bearing 26 as possible. Since it is desirable to mount the flywheel as close to the bearing 26 as possible, and in order to eliminate bulkiness in construction, the most feasible place for the flywheel is within the motor housing.

The flywheel is herein also used as a means for circulating the air through the housing for cooling the motor. The flywheel is cylindrically shaped and is provided with notches. Each notch has a bottom 50 which extends from the periphery to the face 48 in a plane at an angle of approximately 45° with the face (see Fig. 1), and said notches are each provided with a leading face 51 which extends from the bottom 50 to the front face 48 and to the periphery 47, said face 51 being in a plane approximately at right angles to the entrance face 48 and extending approximately radially from the axis of the flywheel. A trailing face 52 also is provided which inclines from the bottom 50 to the periphery 47 and front face 48, in a plane at an angle of approximately 140° with the bottom surface 50 (see Fig. 3).

The rotation of the motor is in a counter clockwise direction when viewed from Figs. 4 and 5. Rotation of the flywheel in this direction will normally tend to create a vacuum adjacent the leading face 51 causing air to move toward the face 48 of the flywheel and into the notch. The shape of the notch is such that the air in the notch will strike the trailing face 52 causing the air to be discharged from the flywheel radially and build a pressure in said end frame 32 and cause the air to be discharged through the openings 42 and 43 in said end frame 32. In this manner the face 51 will cause air to be drawn through the opening 41 in the end cover 40 and will move through the housing of the motor and about the armature 36 and exit in the manner described.

The trailing face 52 is herein described as being on a plane at approximately 140° from the bottom 50. This may be changed to any angle desired or, the shape of the notch can be made different from that shown and described, for instance, the face 52 could be maintained at the angle described but formed in a plane perpendicular to the entrance face 48. However, the form of the notch as shown in the drawing produces a very efficient cooling of the motor and at the same time a sufficient amount of material is maintained adjacent the periphery of the flywheel to produce a substantial flywheel effect.

The diameter of the flywheel is less than the internal diameter of the shell 33 but is larger than the diameter of the armature 37 and since the notches are formed adjacent the periphery of the flywheel it can readily be seen that the movement of air caused by said notches will cause a ready flow of air about the armature.

It will be noted in Figs. 3 and 4 that there is shown a screen 54 which encircles the flywheel 45 and screens the openings 42 and 43 and functions as a protective device to prevent the possibility of anyone getting one's fingers caught within the notches during the rotation of same. The screen carries buttons 55 which are located within the openings 42 and 43 for the purpose of engaging the side of the openings to limit the movement of the screen within the end frame should said screen tend to rotate or move sideways.

The pressure created within the end frame 32 by the flywheel 45 is higher than the pressure within the gear casing 20 and said pressure in the end frame 32 will exert a force to prevent lubricant from working past the bearing 26 and into the motor housing.

While the form of mechanism herein shown and described constitutes a preferred embodiment of one form of the invention, it is to be understood that other forms might be adopted and various changes and alterations made in the shape, size, and proportion of the elements therein without departing from the spirit and scope of the invention.

What I claim is as follows:

1. A flywheel fan adapted to be located within a housing and to cooperate with a power device enclosed by the housing, comprising a body having a cylindrical periphery and a plane face, and provided with notches extending from the face to the periphery, the notches being arranged to induce circulation of air through the housing.

2. A flywheel fan adapted to be located within a housing and to cooperate with a power device enclosed by the housing, comprising a cylindrical body having a periphery, a face, and a notch, said notch having a bottom extending from said face to said periphery and a trailing face extending from said bottom and inclined relative to a radial plane intersecting the bottom of the notch, said inclined face extending from the bottom in a direction opposite to the direction of rotation of said flywheel fan.

3. A flywheel fan adapted to be located within a housing and to cooperate with a power device enclosed by the housing, comprising a cylindrical body having a periphery, a face, and a notch, said notch having a bottom extending from said face to said periphery and a trailing face extending from said bottom at an angle of approximately 140° with said bottom.

4. A flywheel fan adapted to be located within a housing and to cooperate with a power device enclosed by the housing, comprising a cylindrical body having a periphery, a face, and a notch extending from the face to the periphery at an angle of approximately 45° with the face.

5. A flywheel fan adapted to be located within a housing and to cooperate with a power device enclosed by the housing, comprising a cylindrical body having a periphery, a face, and a notch, said notch having a bottom extending from said face to said periphery and making an angle of approximately 45° with the face and having a trailing face extending from said bottom at an angle of approximately 140° with said bottom.

In testimony whereof I hereto affix my signature.

JOHN G. CAMPBELL.

Witnesses:
MILDRED PEARE,
MILDRED TAPPER.